United States Patent
Ophardt et al.

(10) Patent No.: US 10,278,550 B2
(45) Date of Patent: May 7, 2019

(54) FLUID DISPENSER WITH TIME OF FLIGHT PROXIMITY SENSOR

(71) Applicant: OP-Hygiene IP GmbH, Niederbipp (CH)

(72) Inventors: Heiner Ophardt, Arisdorf (CH); Albrecht Lang, Niederbipp (CH)

(73) Assignee: OP-Hygiene IP GmbH, Niederbipp (CH)

( * ) Notice: Subject to any disclaimer, the term of this patent is extended or adjusted under 35 U.S.C. 154(b) by 8 days.

(21) Appl. No.: 15/589,011

(22) Filed: May 8, 2017

(65) Prior Publication Data

US 2017/0319014 A1 Nov. 9, 2017

Related U.S. Application Data

(60) Provisional application No. 62/411,094, filed on Oct. 21, 2016, provisional application No. 62/333,689, filed on May 9, 2016.

(51) Int. Cl.

| A47K 10/42 | (2006.01) |
|---|---|
| A47K 5/12 | (2006.01) |
| A47K 10/38 | (2006.01) |
| B65F 1/14 | (2006.01) |
| G01S 17/08 | (2006.01) |
| G01S 17/88 | (2006.01) |
| A47K 10/24 | (2006.01) |

(52) U.S. Cl.
CPC .......... *A47K 5/1217* (2013.01); *A47K 10/24* (2013.01); *A47K 10/38* (2013.01); *A47K 10/42* (2013.01); *B65F 1/14* (2013.01); *G01S 17/08* (2013.01); *G01S 17/88* (2013.01); *B65F 2210/1443* (2013.01); *B65F 2240/1568* (2013.01); *Y02W 30/64* (2015.05)

(58) Field of Classification Search
CPC .......... B65F 2210/168; B65F 2210/144; B65F 2210/1443; A47K 10/24; A47K 10/424
USPC ........................................ 221/102
See application file for complete search history.

(56) References Cited

U.S. PATENT DOCUMENTS

| 1,688,242 A * | 10/1928 | Lawrence | A47K 10/424 |
| | | | 221/102 |
| 2006/0173576 A1* | 8/2006 | Goerg | A47K 10/3845 |
| | | | 700/236 |
| 2010/0180367 A1 | 7/2010 | Elsener et al. | |
| 2012/0072018 A1* | 3/2012 | Norlund | B65F 1/1638 |
| | | | 700/231 |

(Continued)

FOREIGN PATENT DOCUMENTS

| EP | 2450491 | 6/2010 |
| EP | 3203356 | 8/2017 |

(Continued)

*Primary Examiner* — Timothy R Waggoner
(74) *Attorney, Agent, or Firm* — Thorpe North and Western, LLP

(57) ABSTRACT

A hand cleaning fluid dispenser for dispensing fluid onto a user's hand includes a time of flight sensor to determine a distance of a hand of a user below an outlet of the dispenser from which the dispenser when activated dispenses the fluid and a controller to activate the dispenser to dispense the fluid from the outlet when the hand is sensed to be within a predetermined range of distances below the outlet.

19 Claims, 6 Drawing Sheets

(56) References Cited

U.S. PATENT DOCUMENTS

| | | | | |
|---|---|---|---|---|
| 2014/0214697 A1* | 7/2014 | McSweeney | ............ | B65F 1/004 |
| | | | | 705/308 |
| 2015/0228181 A1* | 8/2015 | Himmelmann | ...... | G08B 21/245 |
| | | | | 340/573.1 |
| 2016/0321619 A1* | 11/2016 | Inan | ........................ | G06Q 10/30 |
| 2017/0215655 A1* | 8/2017 | Ophardt | ................. | A47K 3/281 |

FOREIGN PATENT DOCUMENTS

| | | |
|---|---|---|
| WO | 9619715 | 6/1996 |
| WO | 2013056744 | 4/2013 |
| WO | 2014063184 | 5/2014 |
| WO | 2016100137 | 6/2016 |

* cited by examiner

FLUID DISPENSER WITH TIME OF FLIGHT PROXIMITY SENSOR

SCOPE OF THE INVENTION

This invention relates to the use of precise distance measuring sensors in washroom appliances including notably in a triggering mechanism for a liquid dispenser and in monitoring the supply level in paper towel dispensers and toilet paper dispensers and in measuring the extent to which a waste bin or spool are empty.

BACKGROUND OF THE INVENTION

Known touchless dispensers of hand cleaning fluids are triggered by sensors which measure relative changes of environmental conditions such as in the case of known infrared sensors, optical reflectants and, in the case of capacitive sensors, the change of a capacitive field around the sensors. Such known sensors typically measure a relative change of the environmental conditions within a certain time frame. Such known infrared sensors and capacitive sensors suffer a number of disadvantages. For example, infrared sensors are often rendered inoperative due to infrared radiation which may arise and change in the environment. Capacitive sensors may have difficulty measuring the change in capacitive fields depending upon the environmental conditions.

Some known touchless dispensers provide for a number of different sensors to control different features. For example, one infrared sensor may determine the presence of a user's hand below a fluid outlet and another infrared sensor may be provided on the dispenser at a different location as to sense hand gestures as delivered by movement of a user's second hand above the dispenser, for example, to dispense an additional dosage of liquid.

Currently known dispenser systems do not provide a simple arrangement of a sensor for both triggering liquid dispensing and provide an input for hand movement controlled gestures.

The inventors of the present invention have appreciated that known sensors for paper towel dispensers and toilet paper dispensers merely determine the signal condition such as, for example, an empty condition and do not provide other information useful for the control and management of the dispenser. Similarly, sensors used to sense the level of waste within a waste bin typically provide input on but a single condition such as, for example, a full condition and suffer the disadvantage they do not provide other information by a single sensor which can be useful in the control and management of waste bins.

SUMMARY OF THE INVENTION

To at least partially overcome these disadvantages of previously known devices, the present invention provides for the use of a precise distance measuring sensor for various applications including the triggering of a liquid dispenser, and the determining of the level of supply of disposable product in a dispenser such as a paper towel dispenser and a toilet paper dispenser and in the determination of the extent to which a waste bin is full.

In a $1^{st}$ feature, the present invention provides a precise distance measuring sensor such as a time of flight sensor is used to measure the distance between the sensor and a target object precisely over time to develop useful feedback for the operation, control and management of appliances including hand cleaning liquid dispensers, paper towel dispensers, toilet paper dispensers and waste bins. In accordance with the present invention, the accurate distance measuring sensors are used to trigger the dispensing of a consumable product such as a hand cleaning product, paper towel and toilet paper. The triggering can arise by the sensor activating the dispenser to dispense product when the user's hand is sensed to be within a predetermined range of distances from an outlet of the product and/or to recognize hand gestures of a hand of a user towards controlling dispensing based on the hand gestures of a user.

In a $2^{nd}$ feature, the present invention provides a hand cleaning fluid dispenser for dispensing fluid onto a user's hand, the dispenser including a time of flight sensor to determine a distance of a hand of a user below an outlet of the dispenser from which the dispenser when activated dispenses the fluid;

the dispenser including a controller to activate the dispenser to dispense the fluid from the outlet when the hand is sensed to be within a predetermined range of distances below the outlet. Preferably, the controller activates the dispenser to dispense a first dose of fluid when a hand is first sensed to be within the predetermined range of distances. Preferably, the controller activates the dispenser such that after dispensing the first dose of fluid, the hand is sensed to be moved from within a first pre-set range of distances below the outlet to a second range of distances below the outlet and then back to the first range of distances below the outlet. Preferably, the controller controls the frequency of operation of the time of flight sensor that the time of flight sensor operates to determine the distance of the hand below the outlet. Preferably, the time of flight sensor on failing to sense a moving object within a predetermined scanning volume within a first period of time activating the sensor to scan at a frequency with a first time interval between scans provided no moving object has been sensed by the sensor for a first period of time, the controller controlling the sensor such that after a moving object has been sensed by the sensor, the sensor is activated with a second period of time between sensing and, if the sensor senses an object within a predetermined range of distances below the outlet, the controller activates the sensor for sensing at a third time interval between sensing, the third time interval being smaller than the second time interval and the second time interval being smaller than the first time interval. Preferably, the dispenser is powered by a battery and the controller controls the operation of the flight sensor to reduce the consumption of the electrical power from the battery by reducing the frequency that the sensor is activated to sense moving objects. Preferably, the dispenser includes a reservoir containing the fluid to be dispensed, a pump for dispensing fluid from the reservoir out the outlet and onto the user's hand.

In a $3^{rd}$ feature, the present invention provides a fluid dispenser including:

a reservoir containing a fluid to be dispensed, the fluid having an upper surface which varies in height as the fluid is dispensed, a time of flight sensor to determine a distance of the upper surface from a reference point above the upper surface, a controller to estimate the extent to which the reservoir is full or empty based on the distance determined by the sensor.

In another aspect, the present invention provides a paper dispenser including:

a paper supply comprising a roll of paper sheet material or a stack of paper sheet material to be dispensed, the paper supply having a surface of the paper sheet material which varies in distance from a reference point as the paper supply is dispensed, a time of flight sensor to determine a distance of the upper surface from the reference point, a controller to estimate the extent to which the paper supply is full or empty based on the distance determined by the sensor.

In another aspect, the present invention provides a refuse bin including:

an interior cavity bounded by a circumferentially extending side wall and a bottom wall, an access opening via which refuse material may be inserted into the bin and form a pile of the refuse within the cavity supported on the bottom wall and constrained between the side walls with the pile having an upwardly directed uppermost surface which varies in distance from a reference point fixed above the refuse as the refuse is inserted into the bin, a time of flight sensor to determine a distance of the uppermost surface from the reference point, a controller to estimate the extent to which the bin is full or empty based on the distance determined by the sensor.

The invention provides as a $4^{th}$ feature a hand cleaning fluid dispenser for dispensing fluid onto a user's hand, the dispenser including a time of flight sensor to determine at successive times a distance of a moving object relative an outlet of the dispenser from which the dispenser when activated dispenses the fluid;

the dispenser including a controller to activate the dispenser to dispense the fluid from the outlet when the distance of the moving object is sensed to be within a first set of predetermined distances below the outlet that fluid dispensed from the outlet will engage the moving object.

The invention provides as a $5^{th}$ feature, as in the $4^{th}$ feature, a hand cleaning fluid dispenser wherein the controller activates the dispenser to dispense a first dose of fluid when the moving object is first sensed to be within the first set of predetermined distances below the outlet.

The invention provides as a $6^{th}$ feature, as in the $4^{th}$ or $5^{th}$ feature, a hand cleaning fluid dispenser in which the dispenser includes a battery, the dispenser is powered by the battery and the controller controls the operation of the flight sensor to reduce the consumption of the electrical power from the battery by changing the frequency that the sensor is activated to sense the distance of moving objects from the outlet.

The invention provides as a $7^{th}$ feature, as in the $6^{th}$ feature, a hand cleaning fluid dispenser in which the controller changing the frequency that the sensor is activated to sense the distance of moving objects as a function of the distance of sensed.

The invention provides as a $8^{th}$ feature, as in the $6^{th}$ or $7^{th}$ feature, a hand cleaning fluid dispenser wherein the controller increasing the frequency that the sensor is activated to sense a moving object as the distances sensed reduce and the controller decreasing the frequency that the sensor is activated to sense a moving object as the distances sense increase.

The invention provides as a $9^{th}$ feature, as in any one of the $6^{th}$ to $8^{th}$ features, a hand cleaning fluid dispenser in which the controller changing the frequency that the sensor is activated to sense the distance of moving objects as a function of the time passed since the distance of a moving object was last sensed.

The invention provides as a $10^{th}$ feature, as in the $9^{th}$ feature, a hand cleaning fluid dispenser wherein the controller increasing the frequency that the sensor is activated to sense a moving object as the time passed since the distance of a moving object was last sensed reduces and the controller decreasing the frequency that the sensor is activated to sense a moving object as the time passed since the distance of a moving object was last sensed increases.

The invention provides as a $11^{th}$ feature, as in the $10^{th}$ feature, a hand cleaning fluid dispenser wherein:

when the time of flight sensor does not sense during a first period of time moving objects within a second set of predetermined distances greater than distances of the first set of predetermined distances, the controller controlling the sensor to sense at a first frequency, and while the time of flight sensor is sensing at the first frequency or greater than the first frequency, when a moving object is sensed within the first set of predetermined distances relative the outlet, the controller controlling the sensor to sense at a second frequency less that the first frequency.

The invention provides as a $12^{th}$ feature, as in the $11^{th}$ feature, a hand cleaning fluid dispenser wherein:

while the time of flight sensor is sensing at the second frequency or less than the first frequency when a moving object is sensed within a third set of predetermined distances relative the outlet within the first set of predetermined distances but less than at least some of the distances within the first set of predetermined distances, the controller controlling the sensor to sense at a frequency less than the second frequency, and when the time of flight sensor does not sense during a third period of time a moving object within the third set of predetermined distances, the controller controlling the sensor to sense at a frequency at or below the second frequency.

The invention provides as a $13^{th}$ feature, as in any one of the $4^{th}$ to $12^{th}$ features, a hand cleaning fluid dispenser wherein the dispenser includes a reservoir containing the fluid to be dispensed, a pump for dispensing fluid from the reservoir out the outlet and onto the user's hand.

The invention provides as a $14^{th}$ feature, a device having a consumable attribute which is consumed during use and which is replaceable, the consumable attribute having a reference surface which varies in distance from a reference point as the consumable attribute is consumed, a time of flight sensor to determine a distance of the reference surface from the reference point, a controller to estimate the extent to which the consumable attribute is present in the device based on the distance determined by the sensor.

The invention provides as a $15^{th}$ feature, as in the $14^{th}$ feature, a device wherein:

the device is a dispenser of the consumable attribute, the consumable attribute comprising a consumable material to be dispensed by the dispenser, and the consumable material having the reference surface which varies in distance from the reference point as the consumable material is dispensed.

The invention provides as a $16^{th}$ feature, as in the $15^{th}$ feature, a device wherein the dispenser comprises a fluid dispenser, the consumable material comprises a fluid, the fluid dispenser including reservoir containing the fluid, the fluid within the reservoir having an upper surface comprising the reference surface, the reference point being above the upper surface, the controller estimating the extent to which the reservoir is full or empty based on the distance determined by the sensor.

The invention provides as a 17th feature, as in the 15th feature, a device wherein the dispenser comprises a paper dispenser, the consumable material comprises a paper supply comprising a roll of paper sheet material or a stack of paper sheet material, the paper supply having a surface of the paper sheet material comprising the reference surface, the controller estimating the extent to which the paper supply is full or empty based on the distance determined by the sensor.

The invention provides as a 18th feature, as in the 14th feature, a device wherein:

the device is a refuse bin, the bin having an interior cavity bounded by a circumferentially extending side wall and a bottom wall, and an access opening via which refuse material may be inserted into the bin and form a pile of the refuse within the cavity supported on the bottom wall and constrained between the side walls with the pile having an upwardly directed uppermost surface which varies in distance from the reference point as the refuse material is inserted into the bin, the uppermost surface comprising the reference surface, the reference point fixed above the refuse, the controller estimating the extent to which the bin is full or empty of the refuse material based on the distance determined by the sensor.

The invention provides as a 19th feature, as in any one of the 14th to 18th features, a device wherein the device is powered by a battery and the controller controls operation of the time of flight sensor to reduce consumption of electrical power from the battery by changing the frequency that the sensor is activated to sense the reference surface as a function of the time passed since a change in the distance was last sensed.

The invention provides as a 20th feature, as in the 19th feature, a device wherein:

the controller comparing the distance determined by operation of the time of flight sensor at different times to determine the change in the distance with time, and when the controller determines that the change in distance is nil over a first period of predetermined time, then the controller reduces the frequency of operation of the time of flight sensor to determine the distance to a reduced frequency, and while the frequency of operation of the time of flight sensor to determine the distance is the reduced frequency, the controller determines when the change in distance is not nil over a second period of predetermined time, then the controller increases the frequency of operation of the time of flight sensor to determine the distance to above the reduced frequency.

The invention provides as a 21st feature, as in any one of the 14th to 20th features, a device wherein the controller has a communications capability to communicate to a remote computer data regarding the distances and time.

The invention provides as a 22nd feature, as in the 21st feature, a device wherein the controller and/or the remote computer estimating when the distance will be representative of the consumable attribute being nil.

The invention provides as a 23rd feature, as in any one of the 14th to 22nd features, a device wherein the controller estimating when the distance will be representative of the consumable attribute being nil.

The invention provides as a 24th feature, a dispenser including:

a reference point, a consumable material to be dispensed, the material having a surface which varies in distance from the reference point as the consumable material is dispensed, a time of flight sensor to determine a distance of the surface from the reference point, a controller to estimate the extent to which the consumable material is present in the dispenser based on the distance determined by the sensor.

The invention provides as a 25th feature, a refuse bin including:

an interior cavity bounded by a circumferentially extending side wall and a bottom wall, an access opening via which refuse material may be inserted into the bin and form a pile of the refuse within the cavity supported on the bottom wall and constrained between the side walls with the pile having an upwardly directed uppermost surface which varies in distance from a reference point fixed above the refuse as the refuse is inserted into the bin, a time of flight sensor to determine a distance of the uppermost surface from the reference point, a controller to estimate the extent to which the bin is full or empty based on the distance determined by the sensor.

The invention provides as a 26th feature, in combination, a paper dispenser and a refuse bin:

the refuse bin comprising an interior cavity bounded by a circumferentially extending side wall and a bottom wall, and an access opening via which refuse material may be inserted into the bin and form a pile of the refuse within the cavity supported on the bottom wall and constrained between the side walls with the pile having an upwardly directed uppermost surface which varies in distance from the access opening above the refuse as the refuse is inserted into the bin, the paper dispenser carrying a first time of flight sensor to determine a distance of the uppermost surface of the pile from the time of first time of flight sensor, the paper dispenser mounted above the refuse bin located to provide a direct line of sight from the first time of flight sensor to the uppermost surface through the access opening and the cavity, the paper dispenser carrying a controller to estimate the extent to which the bin is full or empty based on the distance determined by the first time of flight sensor.

The invention provides as a 27th feature, as in the 26th feature, the combination wherein:

the paper dispenser carries a paper supply comprising a roll of paper sheet material or a stack of paper sheet material, the paper supply having a paper surface of the paper sheet material, the paper dispenser carrying a second time of flight sensor to determine a distance of the paper surface of the pile from the second time of flight sensor, and the controller estimating the extent to which the paper supply is full or empty based on the distance determined by the second time of flight sensor.

BRIEF DESCRIPTION OF THE DRAWINGS

Further aspects and advantages of the invention will appear from the following description taken together with the accompanying drawings, in which.

DETAILED DESCRIPTION OF THE DRAWINGS

Reference is made to FIGS. 1 to 6 which illustrate a touchless hand cleaning fluid dispenser 10. The fluid dispenser 10 is supported by a support structure, not shown, such as by being attached to a wall in a washroom or a wall in a hospital or supported from the floor as by a stand, not shown. The dispenser 10 includes a reservoir 11 containing a fluid to be dispensed and a discharge outlet 12 out of which the fluid is to be dispensed.

Figure 7:
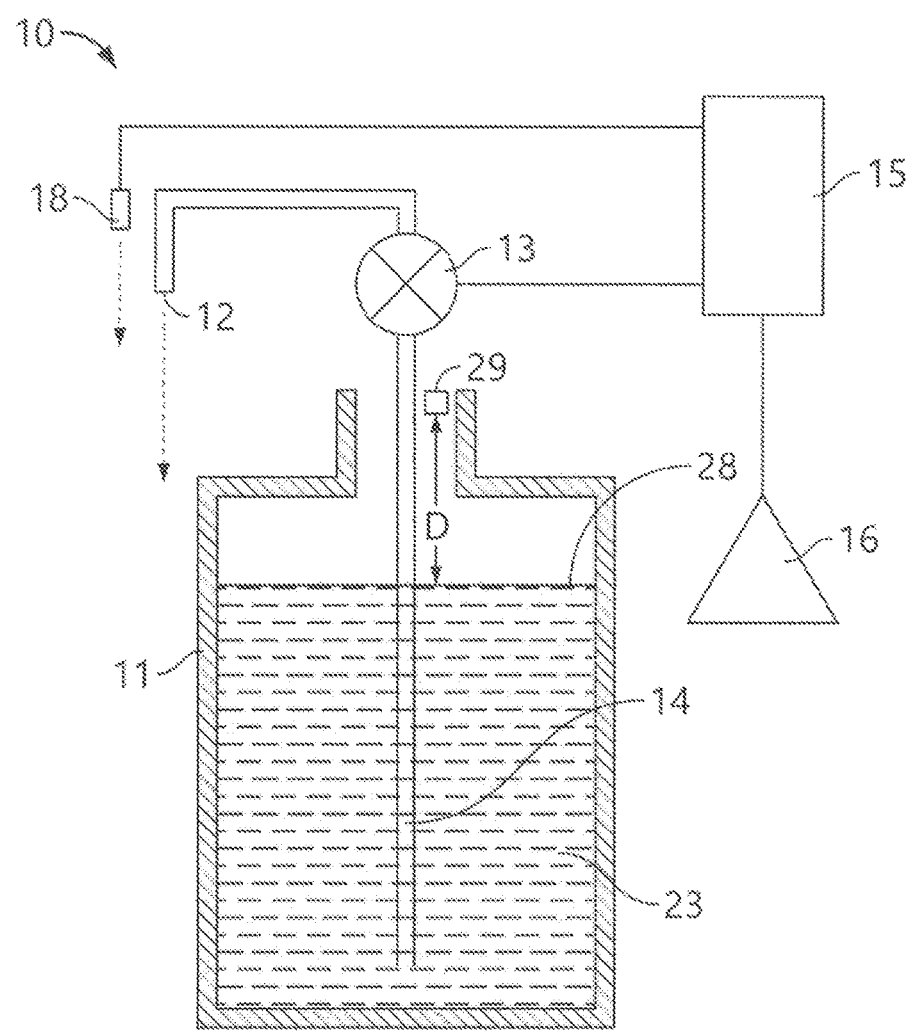
FIG. 7 is a schematic cross-sectional side view of the dispenser of FIG. 1.

Referring to FIG. 7, the dispenser 10 is schematically illustrated as including a pump 13 to draw liquid via a dip tube 14 from the reservoir for dispensing of fluid downwardly out the discharge outlet 12. The dispenser 10 includes a controller 15, an electrical power source 16 comprising preferably a replaceable or rechargeable battery and a sensor 18. The controller 15 is electrically connected to the pump 13 and the sensor 18 and suitably delivers power from the battery 16 to the pump 13 and the sensor 18 to activate them. The sensor 18 is a precise distance measuring sensor, preferably a time of flight sensor which measures the distance between the sensor and a target object directly by measuring the flight time of photons transmitted from the sensor 18 that are reflected by a target to the sensor 18. The time of flight sensor 18 emits a very short light pulse and uses a photosensitive element such as a photo diode to sense the photons reflected by a target object back to the sensor 18. A time counter determines the flight time between the transmission of the light pulses and the sensing of the reflected light. Preferred precise distance measuring sensors preferably can measure the distance between the sensor and an object with the field of view of the sensor accurately, preferably, to distances of less than 100 millimeters, more preferably, 50 millimeters, more preferably, 5 millimeters and, more preferably, 1 millimeter.

Reference is made to FIGS. 1 to 8 which show a preferred hand control operation of a liquid dispenser 10 utilizing a single sensor 18 in accordance with the present invention.

Figure 1:
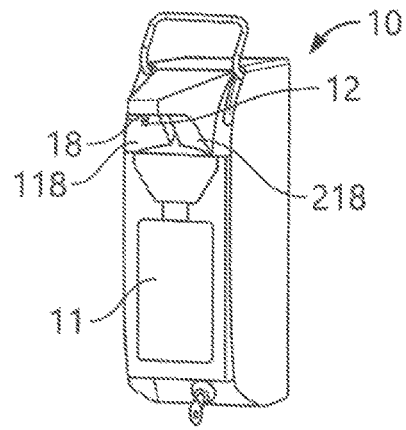
FIG. 1 is a perspective view of a touchless dispenser of a hand cleaning fluid.

FIG. 1 illustrates a dormant condition of the dispenser 10. The dormant condition is a condition in which the sensor 18 does not detect any object moving within the field of view of the sensor 18 or at least within a preselected dormant distance, for example, within a radius of 18 inches from the sensor 18. The sensor 18 has a field of view that assesses the distance of a moving object from the outlet below the outlet.

Figure 2:
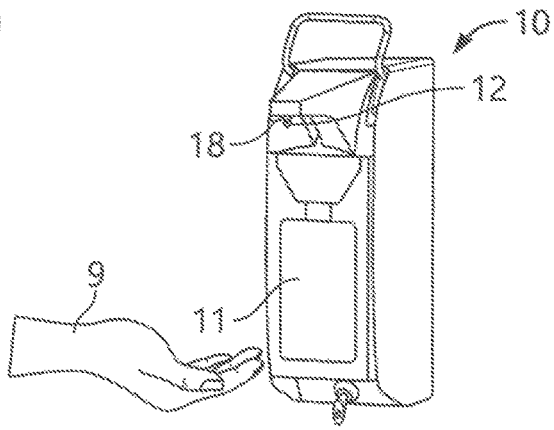
FIG. 2 is a perspective view of the dispenser of FIG. 1 with a hand in distant proximity to the dispenser.

FIG. 2 illustrates a condition in which a hand 9 of a user is moved within 18 inches of the sensor 18 and the movement of the hand is sensed by the sensor 18. The condition illustrated in FIG. 2 is indicated as a ready condition.

Figure 3:
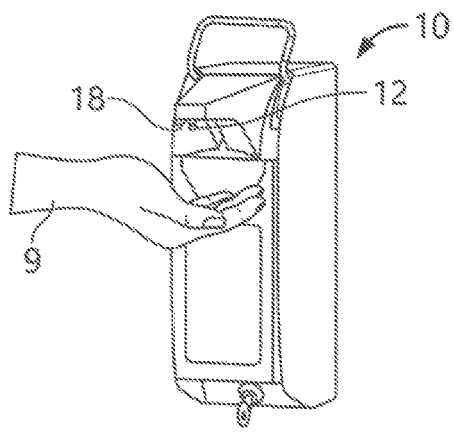
FIG. 3 is a perspective view of the dispenser and hand as in FIG. 2 with the hand in an proximate condition.

FIG. 3 indicates an active condition of the dispenser in which the user's hand 9 has been moved so as to be located within a predetermined active range of distances below the outlet 12, for example, selected to be within the range of two to six inches below the outlet. The predetermined range or set of distances below the outlet is selected having regard to the field of view of the sensor to be such that fluid dispensed from the outlet will engage the user's hand. In this active condition, on the hand 9 first being located in this active range of distances below the outlet 12 and maintaining the hand 9 in such position for a predetermined period of time, the controller 15 activates the pump 13 so as to dispense a single dose, preferably 1 milliliter of fluid onto the person's hand 9.

Figure 4:
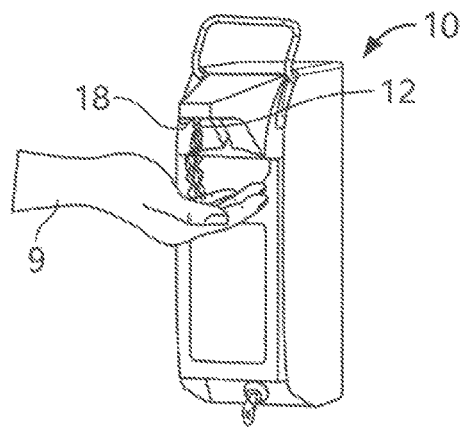
FIG. 4 is a pictorial view the same as FIG. 3 with the hand in an proximate condition but showing fluid as being dispensed onto the hand from the outlet.

FIG. 4 illustrates a condition in which a first dose of fluid is being dispensed onto the user's hand 20.

Figure 5:
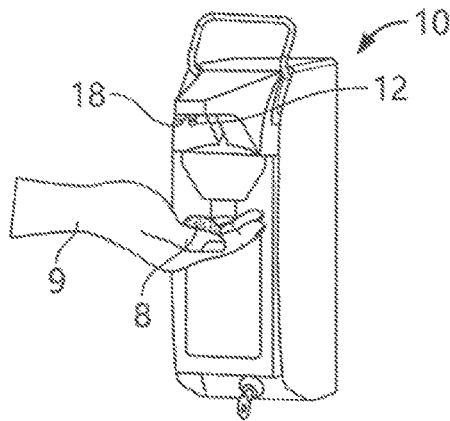
FIG. 5 is a perspective view the same as FIG. 4 with a first dose of fluid on the palm of the hand and with the palm of the hand having been moved vertically downwardly from the position of FIG. 4.
Figure 6:
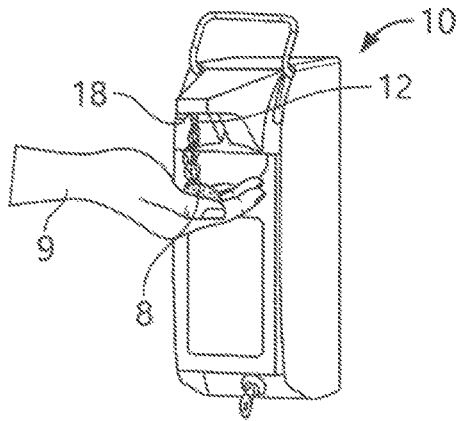
FIG. 6 is a pictorial view the same as FIG. 5, however, in which the hand has been moved vertically upwardly from the position of FIG. 5 to the position of FIG. 4 and a second dose of fluid is being dispensed onto the hand from the outlet.

FIG. 5 illustrates an additional active condition of the dispenser 10 in which from the position shown in FIG. 4, the hand 9 has been moved vertically downwardly such that the hand 9 remains within the active range of distances below the outlet 12 and then, subsequently, relatively abruptly, the hand 9 is move from the position of FIG. 5 to the position of FIG. 6 in which the hand 9 is in the substantially same position as in FIG. 4. The sensor 18 senses the vertical downward movement of the hand 9 from the position of FIG. 4 to the position of FIG. 5 and then subsequently from the position of FIG. 5 to the position of FIG. 6 within an acceptable period of time. The controller 15 on sensing this movement activates the pump 13 so as to dispense a second dose of fluid from the outlet 12 and FIG. 6 illustrates a second dose of fluid being dispensed from the outlet 12 onto the hand of a user. FIG. 5 illustrates the hand 9 of the user as carrying the first dose of fluid 8.

After dispensing of any dose of fluid, additional movement of the hand of the user in a hand gesture downwardly and then back upwardly, for example, from the position of FIG. 4 to the position of FIG. 5 and then back to the position of FIG. 4, will result in an additional dose of fluid being dispensed onto a user's hand.

In the context of a touchless dispenser 10 as shown, for example, in FIG. 7 in which the power source 16 is a battery which may or may not be rechargeable, then in accordance with the present invention, the operation of the sensor 18 is controlled so as to attempt to reduce energy consumption by the sensor 18. In this regard, preferably in a dormant condition as shown, for example, in FIG. 1, when the sensor 18 has not sensed any target object within a predetermined distance from the sensor 18 for a predetermined period of time, then the sensor 18 is activated by the controller 15 to scan at a relatively low frequency, for example, one to four scans per second or less so as to save electrical power. With an object being sensed as being moved within a ready viewing space, for example, within an 18 inch radius from the outlet 12, the controller 15 increases the scan rate of the sensor 18 as, for example, to eight scans per second. Preferably, with the scan rate at this intermediate scan rate of eight scans per second, the controller 15 uses the sensor 18 to determine if the hand 9 of a user is within the active range and will activate the pump 13 to dispense fluid. Once the controller 15 has activated the pump 13 to dispense fluid, the controller 15 preferably increases the scan rate of the sensor 18 as, for example, to a gesture scan rate of, for example, about sixteen scans per second which gesture scan rate is selected such that the sensor 18 can detect the gestures of the hand 9, that is, for example, the movement of the hand 9 between the positions of FIGS. 4, 5 and 6 with time.

The scan rate of the sensor 18 is the frequency that the sensor 18 is activated to scan for objects with time. In accordance with the present invention, the controller 15 controls the scan rate so as to reduce the scan rate and thereby save energy during dormant periods of time, increase the scan rate to provide for fluid activation during certain periods of time and, preferably, to further increase the scan rate at times when the sensor 18 is desired to detect gestures of the hand 9.

In accordance with the present invention, preferably, a single sensor 18 is utilized and a single sensor is adequate to detect gestures of the hand dependent upon varying distances of the hand from the sensor 18.

In a further aspect of the present invention, the sensor 18 may comprise two, more preferably three sensors 18 which are mounted at different locations on the dispenser and can be used to detect three-dimensional gestures within a supervised volume about the dispenser represented by overlapping volumes in the view range of the sensors. For example, in FIG. 1, two dots 118 and 218 are shown which could represent the location of a secondary and/or third time of flight sensor.

Figure 8:
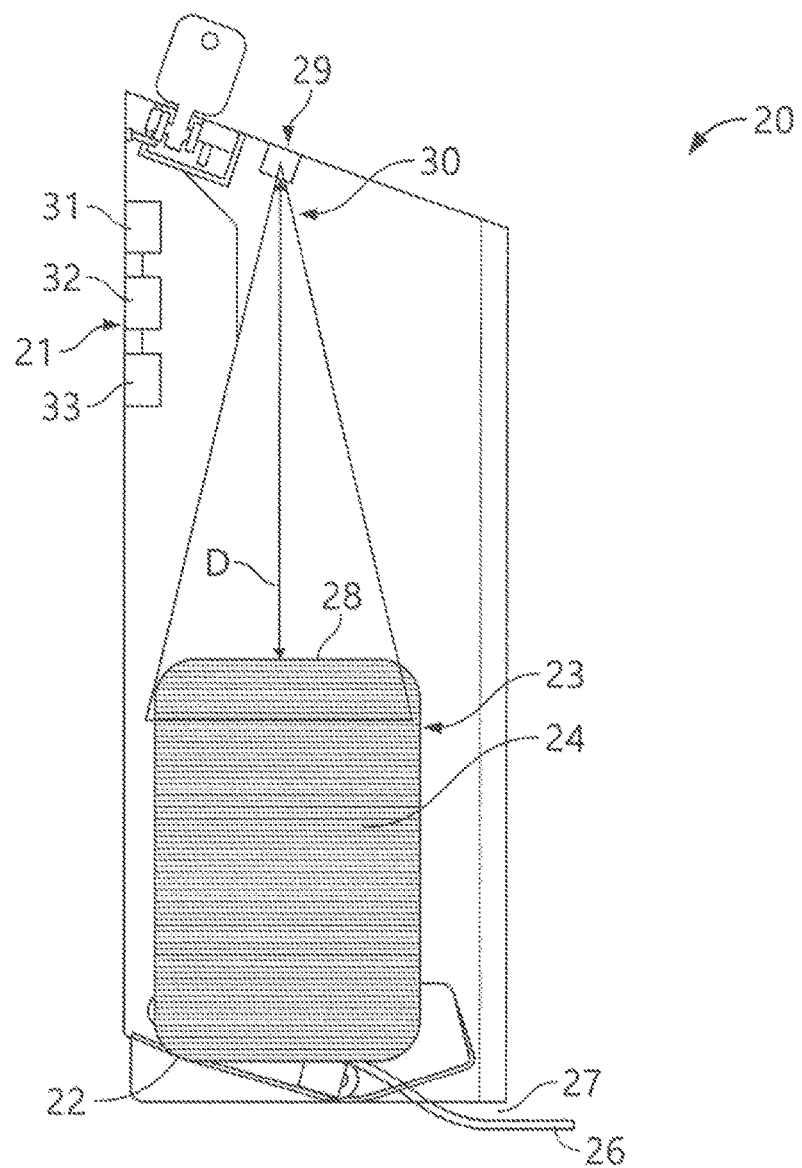
FIG. 8 is a schematic cross-sectional side view of a paper towel dispenser in accordance with the present invention.
Figure 9:
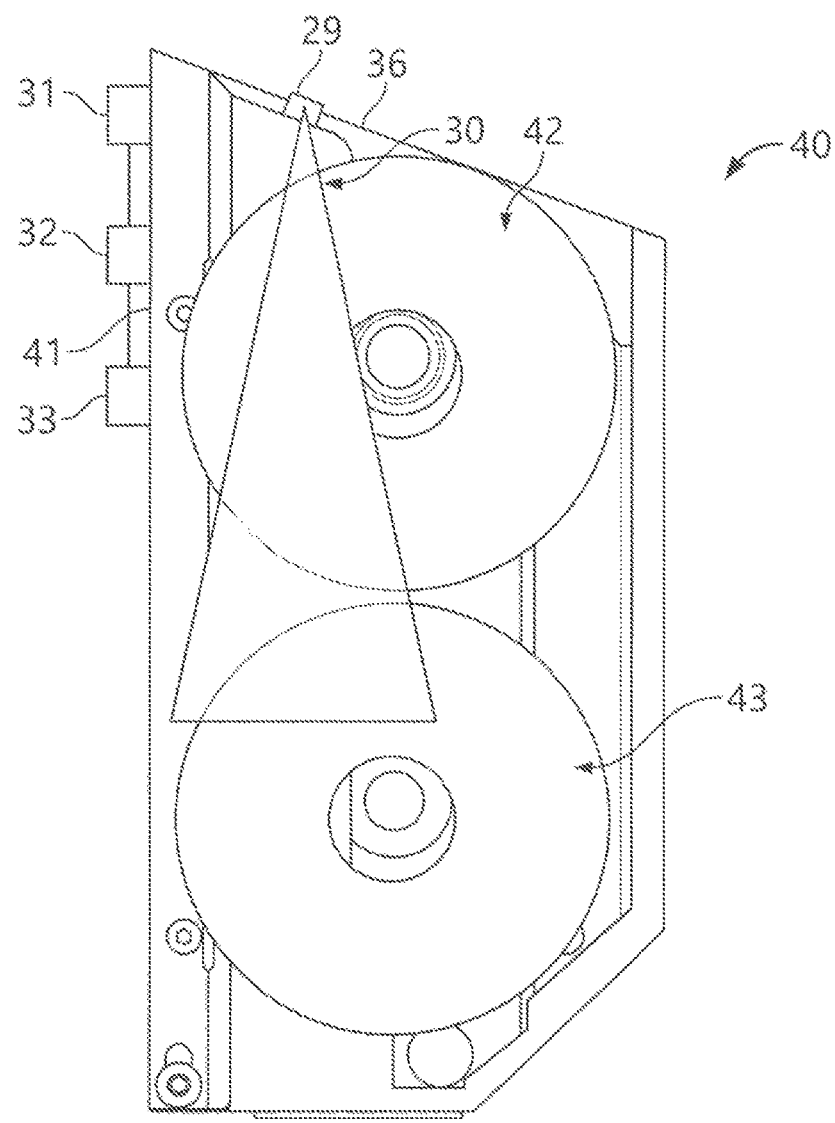
FIG. 9 is a schematic cross-sectional side view of a toilet paper dispenser in accordance with the present invention.

FIG. 8 schematically shows a cross-sectional side of a typical paper towel dispenser 20 consisting of a housing 21 supporting inside the housing on a lower shelf 22 of the housing a sack 23 of nested individual paper towels 24. The lowest-most towel 26 is dispensed out a discharge outlet 27 at a lower end of the housing 21, typically by being manually drawn out by a user. As the towels are dispensed, the height of the stack 23 reduces and a top 28 of the stack moves downwardly with time. As schematically seen in FIG. 9, the dispenser 20 preferably includes a single time of flight sensor 29 emitting a beam 30 downwardly, a controller 31, a power source 32 and a communications device 33.

The single time of flight sensor 29 is provided coupled to the housing 21 to measure the distance D of the top 28 of the stack 23 from the sensor 29 with time. The distance D of the top 28 of the stack 23 from the sensor 29 represents the supply of towels in the dispenser 20.

Data representing the measured distances D with time as well as an identification of the specific dispenser are created and preferably stored and/or transmitted.

The controller 31 not only controls operation of the sensor 29 but also preferably controls the transition of the data preferably to the communication device 33. The communication device could be a simple LED visible to servicing staff on the exterior of the housing and providing an indication of the supply of paper in the dispenser 20. More preferably, the communication device 33 is a wireless communication device as to transmit the data wirelessly to a remote computer server, not shown, from which the data can be utilized to control maintenance of the dispenser 20, for example, as to be read by the servicing staff to determine when to refile the dispenser with paper towels, and to give notices and warnings as to low paper conditions. Such transmitted data is to be gathered and stored so as to provide not only the actual height of the paper stack and therefore the amount of available papers known at any time, but also the history and changes of the amount of paper in the dispenser over the time from which preferably patterns of intensity of usage can be determined. The monitoring of the data on usage with time can be used to predict when the dispenser is going to be empty. Preferably, with such an arrangement, servicing staff are alerted and can know when a dispenser has to be refilled and the time and effort of servicing staff can be optimized as to reduce it to necessary actions.

FIG. 8 shows a paper towel dispenser with a stack of individual paper towels. Other paper dispensers are known in which the paper is dispensed from a roll. The distance of the radially outer surface of the paper on the roll can be measured with the time of flight sensor fixed point on the housing to determine the remaining radius of the roll which will correlate accurately the amount of paper supply on the roll in the dispenser.

Toilet Paper Dispenser

FIG. 9 schematically shows a cross-sectional side of a toilet paper dispenser 40 consisting of a housing 41 supporting inside the housing a spare upper roll 42 of toilet paper and an active lower roll 43 of toilet paper. While only the lower roll 43 need be provided, preferably, the upper roll 42 is placed supported on the lower roll 43 and falls into the location of the lower roll 43 when the lower roll 43 is used up. As schematically seen in FIG. 9, similar to that in FIG. 8, the dispenser 20 preferably includes a single time of flight sensor 29 emitting a beam 30 downwardly, a controller 31, a power source 32 and a communications device 33. The sensor 29 is mounted inside the top of a shroud 36, looking downwards to the paper rolls 42 and 43 and measuring the distance from the sensor 29 to the closest roll. If two rolls are placed on top of each other, the sensor 29 sees only the upper roll 42. When two rolls are in the dispenser, then the surface of the upper roll 42 is sensed as at an approximately constant distance. When only one roll is in the dispenser as in the lower position shown by lower roll 43, then the sensor 29 effectively measures the radius of the active lower roll 43 and thus provides an indication as to the paper remaining with time.

Waste Bin

Figure 11:
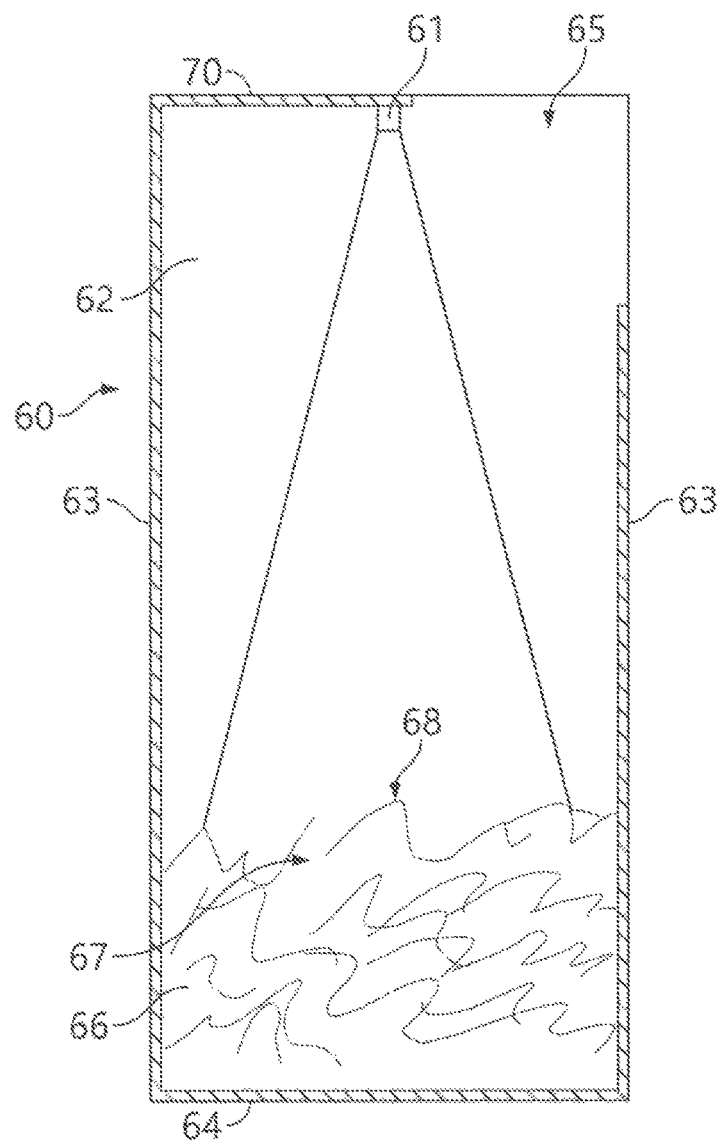
FIG. 11 is a schematic cross-sectional side view of a waste bin in accordance with the present invention.

FIG. 11 schematically shows a cross-sectional side view of a waste bin 60 and an associated time of flight sensor 61. The bin 60 defines an interior cavity 62 bounded by circumferential side walls 63 and a bottom wall 64. An access opening 65 is provided into the cavity 60 via which refuse material 66 shown as used paper towels may be inserted into the bin 60 to form a pile 67 of the refuse within the cavity 62. The pile 67 is supported on the bottom wall 64 and constrained inside the side walls 63. The pile 67 has an upwardly directed uppermost surface or top 68.

The time of flight sensor 61 is fixed at a reference point above the bin 60 such that the field of view of the time of flight sensor 61 is downward into the cavity 62 to measure the distance from the time of flight sensor 61 to the uppermost surface 68. By measuring this distance, the extent to which the bin 60 is filled can be determined at any time and over time.

Figure 10:
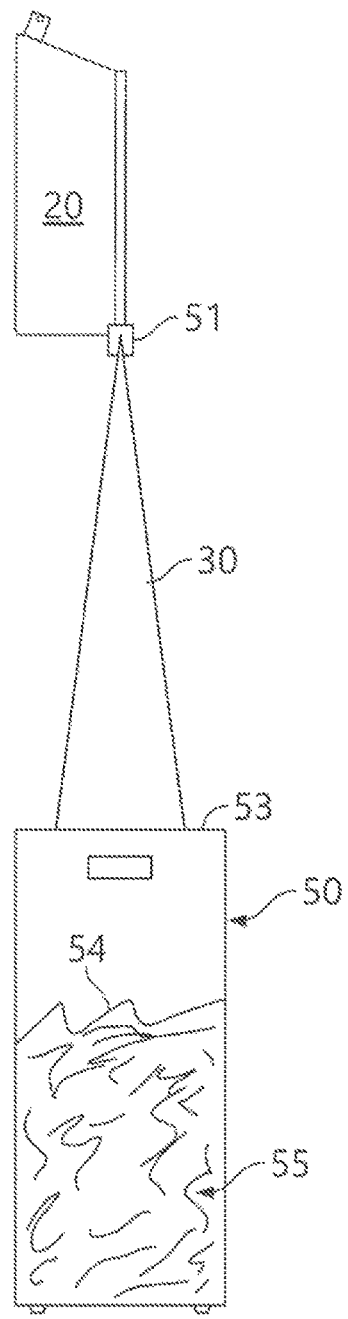
FIG. 10 is a schematic cross-sectional side view of a paper dispenser above a waste bin in accordance with the present invention.

While not shown on FIG. 11, the arrangement of FIG. 10 in a manner similar to FIG. 9 preferably includes a controller, a power source and a communication device.

The time of flight sensor 61 may preferably be secured to the waste bin 60 as onto a lid or cover 70 or the wall 57 of the bin 60. In the bin 60 of FIG. 11, the access opening 65 is provided as upwardly opening through the cover 70 and horizontally through the walls 63.

FIG. 10 schematically shows a cross-sectional side view of a waste bin 50 preferably mounted below a separate time of flight sensor 51. Preferably, a paper towel dispenser 20, such as in FIG. 8, is mounted above the waste bin 50 and the sensor 51 is mounted on the paper towel dispenser 52. The sensor 51 is mounted above the waste bin 50 so that its field of view is into the waste bin 51 through an upwardly opening 53 into the waste bin 50 from the top. By measuring the distance between the sensor 51 and the top 54 of a pile of waste paper 55 in the bin 50, the extent to which the bin 50 is filled can be determined with time. While not shown on FIG. 10, the arrangement in FIG. 10 in a similar manner to that in FIG. 9 preferably includes a controller, a power source and a communications device, and when the sensor is on a dispenser 20 above the bin 54 which dispenser also has its own sensor 29, then the two sensors may be controlled by the same controller and share the same power source and communications device. In this configuration of FIG. 10, only one controller, power supply, and communication device is required in the dispenser 20 to measure both the extent the dispenser reservoir contains fluid and the extent that the bin 50 contains waste paper.

Referring to FIG. 7, FIG. 7 shows, using reference numbers the same as in FIG. 8, an arrangement for using a single time of flight sensor 29 to measure the distance D of the top surface 28 of fluid 23 in the reservoir 11 from the sensor 29 with time. The distance D of the top 28 of the fluid 23 from the sensor 29 represents the supply of liquid in the reservoir 11. As with the arrangement of FIG. 8, in an arrangement of FIG. 7, the sensor 29 is preferably mounted as to a housing for the fluid dispenser such that the sensor is located at a reference point where the sensor can direct its beam onto the top surface 28 of fluid 23 in the reservoir.

While the invention has been described with reference to preferred embodiments, many variations and modifications may now occur to a person skilled in the art. For a definition of the invention, reference is made to the following claims.

We claim:

1. In combination a paper dispenser and a refuse bin, the refuse bin comprising an interior cavity bounded by a circumferentially extending side wall and a bottom wall, and
an upwardly opening access opening via which refuse material may be inserted into the bin and form a pile of the refuse material within the cavity supported on the bottom wall and constrained within the side wall with the pile having an upwardly directed uppermost surface which varies in distance from the access opening above the refuse material as the refuse material is inserted into the bin,
the paper dispenser carrying a first time of flight sensor to determine a distance of the uppermost surface of the pile from the time of first time of flight sensor,
the paper dispenser mounted above the refuse bin located to provide a direct line of sight from the first time of flight sensor to the uppermost surface of the pile through the access opening and the cavity,
the paper dispenser carrying a controller to estimate the extent to which the bin is full or empty based on the distance determined by the first time of flight sensor, and wherein:
the paper dispenser carries a paper supply comprising a roll of paper sheet material or a stack of paper sheet material,
the paper supply having a paper surface of the paper sheet material,
the paper dispenser carrying a second time of flight sensor to determine a distance of the paper surface from the second time of flight sensor, and
the controller estimating the extent to which the paper supply is full or empty based on the distance determined by the second time of flight sensor.

2. A combination as claimed in claim 1 wherein the first time of flight sensor, the second time of flight sensor and the controller are powered by a battery and the controller controls operation of the first time of flight sensor and the second time of flight sensor to reduce consumption of electrical power from the battery by changing the frequency that the first time of flight sensor is activated to determine the distance of the uppermost surface of the pile from the time of first time of flight sensor as a function of the time passed since a change in the distance of the uppermost surface of the pile from the time of first time of flight sensor was last sensed, and by changing the frequency that the second time of flight sensor is activated to determine the distance of the paper surface from the time of second time of flight sensor as a function of the time passed since a change in the distance of the paper surface from the second time of flight sensor was last sensed.

3. A combination as claimed in claim 2:
the controller increasing the frequency that the first time of flight sensor is activated as the time passed since the distance of the uppermost surface of the pile from the first time of flight sensor was last sensed reduces, and
the controller decreasing the frequency that the first time of flight sensor is activated as the time passed since the distance of the uppermost surface of the pile from the first time of flight sensor was last sensed increases.

4. A combination as claimed in claim 2:
the controller increasing the frequency that the second time of flight sensor is activated as the time passed since the distance of the paper surface from the second time of flight sensor was last sensed reduces, and
the controller decreasing the frequency that the second time of flight sensor is activated as the time passed since the distance of the paper surface from the time of second time of flight sensor was last sensed increases.

5. A device as claimed in claim 1 wherein the controller has a communications capability to communicate to a remote computer data regarding the distances sensed and time.

6. A device as claimed in claim 5 wherein the controller and/or the remote computer estimating when the distance of the paper surface from the second time of flight sensor will be representative of the paper supply being empty.

7. A device as claimed in claim 5 wherein the controller and/or the remote computer estimating when the distance of the uppermost surface of the pile from the first time of flight sensor paper surface will be representative of the bin being full.

8. A device as claimed in claim 1 wherein the controller estimating when the distance of the paper surface from the second time of flight sensor will be representative of the paper supply being empty.

9. A device as claimed in claim 1 wherein the controller estimating when
the distance of the uppermost surface of the pile from the time of first flight sensor paper surface will be representative of the bin being full.

10. A combination as claimed in claim 1 wherein:
the paper dispenser carrying a communications device to transmit data wirelessly to a remote computer,
the data including the extent to which the bin is full or empty based on the distance determined by the first time of flight sensor and the extent to which the paper supply is full or empty based on the distance determined by the second time of flight sensor.

11. A combination as claimed in claim 1 wherein the paper dispenser carrying a power source for the first time of flight sensor, the second time of flight sensor and the controller.

12. A combination as claimed in claim 11 wherein the power source is a battery.

13. In combination a paper dispenser and a refuse bin,
the refuse bin comprising an interior cavity bounded by a circumferentially extending side wall and a bottom wall, and
an upwardly opening access opening via which refuse material may be inserted into the bin and form a pile of the refuse material within the cavity supported on the bottom wall and constrained within the side wall with the pile having an upwardly directed uppermost surface which varies in distance from the access opening above the refuse material as the refuse material is inserted into the bin,
the paper dispenser carrying a first time of flight sensor to determine a distance of the uppermost surface of the pile from the first time of flight sensor,
the paper dispenser mounted above the refuse bin located to provide a direct line of sight from the first time of flight sensor to the uppermost surface of the pile through the access opening and the cavity,
the paper dispenser carries a paper supply comprising a roll of paper sheet material or a stack of paper sheet material,
the paper supply having a paper surface of the paper sheet material,
the paper dispenser carrying a second time of flight sensor to determine a distance of the paper surface from the second time of flight sensor.

14. A combination as claimed in claim 13 including a controller to control the operation of the first time of flight sensor and the second time of flight sensor,
the controller estimating the extent to which the bin is full or empty based on the distance determined by the first time of flight sensor,
the controller estimating the extent to which the paper supply is full or empty based on the distance determined by the second time of flight sensor.

15. A combination as claimed in claim 14 herein:
the paper dispenser carrying a communications device to transmit data selected from the group consisting of:
data as to the distance determined by the first time of flight sensor and data based thereon,
data regarding estimates as to the extent to which the bin is full or empty based on the distance determined by the first time of flight sensor,
data as to the distance determined by the second time of flight sensor and data based thereon, and
data regarding estimates as to the extent to which the paper supply is full or empty based on the distance determined by the second time of flight sensor.

16. A combination as claimed in claim 14 wherein the paper dispenser carrying a power source for the first time of flight sensor, the second time of flight sensor and the controller.

17. A combination as claimed in claim 16 wherein the power source is a battery.

18. A method of monitoring the extent to which a refuse bin is full of refuse material, comprising:
providing a refuse bin having an interior cavity bounded by a circumferentially extending side wall and a bottom wall, and an upwardly opening access opening via which refuse material may be inserted into the bin and form a pile of the refuse material within the cavity supported on the bottom wall and constrained within the side wall with the pile having an upwardly directed uppermost surface which varies in distance from the access opening above the refuse material as the refuse material is inserted into the bin,
providing a paper dispenser that carries a paper supply comprising a roll of paper sheet material or a stack of paper sheet material to be dispensed as well as a first time of flight sensor to determine a distance of the uppermost surface of the pile from the first time of flight sensor with the paper dispenser mounted above the refuse bin located to provide a direct line of sight from the first time of flight sensor to the uppermost surface of the pile through the access opening and the cavity,
operating the first time of flight sensor to determine the distance of the uppermost surface of the pile from the first time of flight sensor,
estimating the extent to which the bin is full or empty based on the distance determined by the first time of flight sensor.

19. A method as claimed in claim 18 wherein the paper supply having a paper surface of the paper sheet material,
providing the paper dispenser with a second time of flight sensor to determine a distance of the paper surface from the second time of flight sensor,
estimating the extent to which the paper supply is full or empty based on the distance determined by the second time of flight sensor.

* * * * *